United States Patent
Wu

(10) Patent No.: US 10,849,177 B2
(45) Date of Patent: Nov. 24, 2020

(54) METHOD OF HANDLING RADIO ACCESS TECHNOLOGY INDICATION AND RELATED COMMUNICATION DEVICE

(71) Applicant: HTC Corporation, Taoyuan (TW)

(72) Inventor: Chih-Hsiang Wu, Taoyuan (TW)

(73) Assignee: HTC Corporation, Taoyuan (TW)

( * ) Notice: Subject to any disclaimer, the term of this patent is extended or adjusted under 35 U.S.C. 154(b) by 14 days.

(21) Appl. No.: 16/240,807

(22) Filed: Jan. 7, 2019

(65) Prior Publication Data
US 2019/0215885 A1 Jul. 11, 2019

Related U.S. Application Data

(60) Provisional application No. 62/614,969, filed on Jan. 8, 2018.

(51) Int. Cl.
| | | |
|---|---|---|
| *H04W 76/15* | (2018.01) | |
| *H04W 48/16* | (2009.01) | |
| *H04W 88/06* | (2009.01) | |
| *H04W 48/12* | (2009.01) | |
| *H04W 76/27* | (2018.01) | |

(Continued)

(52) U.S. Cl.
CPC .......... *H04W 76/15* (2018.02); *H04W 48/12* (2013.01); *H04W 48/16* (2013.01); *H04W 76/27* (2018.02); *H04W 88/06* (2013.01); *H04W 16/32* (2013.01); *H04W 80/02* (2013.01)

(58) Field of Classification Search
CPC ..... H04W 76/15; H04W 76/27; H04W 48/16; H04W 48/12; H04W 88/06; H04W 16/32; H04W 80/02
See application file for complete search history.

(56) References Cited

U.S. PATENT DOCUMENTS

2017/0332359 A1* 11/2017 Tsai ................... H04B 7/0639
2017/0367116 A1* 12/2017 Li ..................... H04W 52/0216

(Continued)

FOREIGN PATENT DOCUMENTS

| WO | 2008/058360 A1 | 5/2008 | |
|---|---|---|---|
| WO | WO-2014153434 A1 * | 9/2014 | ............ H04W 36/14 |
| WO | 2016/116145 A1 | 7/2016 | |

OTHER PUBLICATIONS

3GPP TS 36.331 version 14.4.0 Release 14, ETSI TS 136 331 V14.4.0 (Oct. 2017), Section 5.2.2.9, pp. 48-49.

(Continued)

*Primary Examiner* — Ajay Cattungal
(74) *Attorney, Agent, or Firm* — Winston Hsu

(57) ABSTRACT

A communication device camping on a first cell of a first RAT and receiving a first system information block (SIB) of a type from the first cell, wherein the first SIB comprises a first indication indicating that a second RAT is supported by the first cell; a radio resource control (RRC) protocol layer of the communication device processing the first SIB and transmitting a second indication to a first upper layer, in response to the first indication; the communication device camping on a second cell of the first RAT and receiving a second SIB of the type from the second cell, wherein the second SIB does not comprise the first indication; and the RRC protocol layer processing the second SIB and transmitting a third indication to the first upper layer, in response to the second SIB.

9 Claims, 4 Drawing Sheets

(51) Int. Cl.
*H04W 16/32* (2009.01)
*H04W 80/02* (2009.01)

(56) References Cited

U.S. PATENT DOCUMENTS

| | | | |
|---|---|---|---|
| 2018/0270698 A1* | 9/2018 | Babaei | H04W 72/1284 |
| 2018/0324663 A1* | 11/2018 | Park | H04W 36/08 |
| 2019/0174554 A1* | 6/2019 | Deenoo | H04L 5/0048 |
| 2019/0289513 A1* | 9/2019 | Jeon | H04W 52/40 |
| 2019/0342804 A1* | 11/2019 | Futaki | H04W 36/14 |
| 2020/0008043 A1* | 1/2020 | Kim | H04W 36/32 |
| 2020/0053803 A1* | 2/2020 | Youn | H04W 76/10 |
| 2020/0120521 A1* | 4/2020 | da Silva | H04W 24/08 |

OTHER PUBLICATIONS

3GPP TS 36.331 version 14.4.0 Release 14, ETSI TS 136 331 V14.4.0 (Oct. 2017), Section 6.3.1, pp. 319-354.

Search Report dated Mar. 27, 2019 for EP application No. 19150753.2, pp. 1-7.

NEC, "AS support for 5G indication", 3GPP TSG-RAN WG2#99, R2-1708228, Aug. 21-25, 2017, Berlin, Germany, XP051318130, pp. 1-4.

Ericsson, "Introducing 5G indication in LTE RRC SIB", 3GPP TSG-RAN WG2 #99bis, Tdoc R2-1710512, Oct. 9-13, 2017, Prague, Czech Republic, XP051342555, pp. 1-20.

Samsung, "Introducing support for NR", 3GPP TSG-RAN2 WG2 Meeting #99, R2-1709488, Aug. 21-25, 2017, Berlin, Germany, XP051330204, pp. 1-329.

Qualcomm Incorporated, NTT Docomo, SK Telecom, ATT, "NR available indicator for NR Non-Standalone architecture (option 3/7)", 3GPP SA WG2 Meeting#122, S2-174465, Jun. 26-30, 2017, San Jose Del Cabo, Mexico, XP051303313, pp. 1-10.

HTC, "Correction on upperLayerIndication", 3GPP TSG-RAN WG2 NR Ad hoc 1801, R2-1800628, Jan. 22-26, 2018, Vancouver, Canada, XP051386260, pp. 1-3.

* cited by examiner

METHOD OF HANDLING RADIO ACCESS TECHNOLOGY INDICATION AND RELATED COMMUNICATION DEVICE

CROSS REFERENCE TO RELATED APPLICATIONS

This application claims the benefit of U.S. Provisional Application No. 62/614,969 filed on Jan. 8, 2018, which is incorporated herein by reference.

BACKGROUND OF THE INVENTION

1. Field of the Invention

The present invention relates to a communication device and a method used in a wireless communication system, and more particularly, to a communication device and a method of handling a radio access technology indication.

2. Description of the Prior Art

When a user equipment (UE) receives a system information (SI) including an indication indicating that an evolved universal terrestrial radio access (E-UTRA) cell supports a new radio (NR), the UE may display an icon on a screen of the UE according to the indication. However, the UE may always display the icon according to the indication, even when the UE receives another SI not including the indication. Thus, the problem that the UE does not display the icon correctly should be solved.

SUMMARY OF THE INVENTION

The present invention therefore provides a method and related communication device for handling a radio access technology indication to solve the abovementioned problem.

The method includes: the communication device camping on a first cell of a first RAT and receiving a first system information block (SIB) of a type from the first cell, wherein the first SIB comprises a first indication indicating that a second RAT is supported by the first cell; a radio resource control (RRC) protocol layer of the communication device processing the first SIB and transmitting a second indication to a first upper layer, in response to the first indication; the communication device camping on a second cell of the first RAT and receiving a second SIB of the type from the second cell, wherein the second SIB does not comprise the first indication; and the RRC protocol layer processing the second SIB and transmitting a third indication to the first upper layer, in response to the second SIB.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
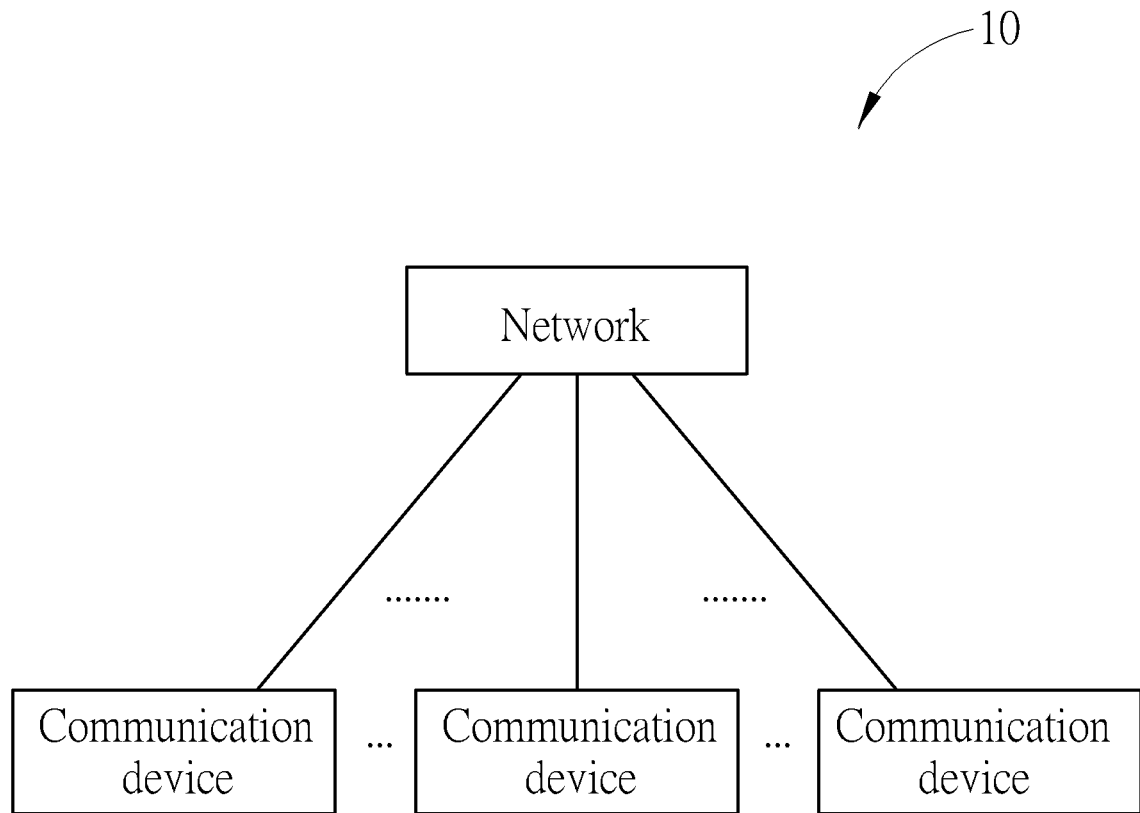
FIG. 1 is a schematic diagram of a wireless communication system according to an example of the present invention.

In FIG. 1, the wireless communication system 10 is briefly composed of a network and a plurality of communication devices. The network and the communication device may (e.g., simultaneously) communicate with each other via one or multiple cells including a primary cell (PCell) and one or more secondary cells (SCells).

Practically, the network may comprise an evolved universal terrestrial radio access (E-UTRA) including at least one evolved Node-B (eNB) which may connect to an evolved packet core (EPC) and/or fifth generation core (5GC). The network may comprise a new radio (NR)/next generation (NextGen) network including at least one 5G base station (BS) (or called gNB) or an evolved gNB (egNB) or a sixth generation (6G) BS. The 5G/6G radio communication technology may employ orthogonal frequency-division multiplexing (OFDM) and/or non-OFDM. In general, a BS may also be used to refer any of the eNB, the gNB, the egNB and the 6G BS.

The communication device may be a user equipment (UE), a mobile phone, a laptop, a tablet computer, an electronic book, a portable computer system, a vehicle, or an aircraft. In addition, the network and the communication device can be seen as a transmitter or a receiver according to direction (i.e., transmission direction), e.g., for an uplink (UL), the communication device is the transmitter and the network is the receiver, and for a downlink (DL), the network is the transmitter and the communication device is the receiver. The communication device may connect to (e.g., access) the NR via the E-UTRA, e.g., an E-UTRA-NR dual connectivity (DC) (EN-DC).

Figure 2:
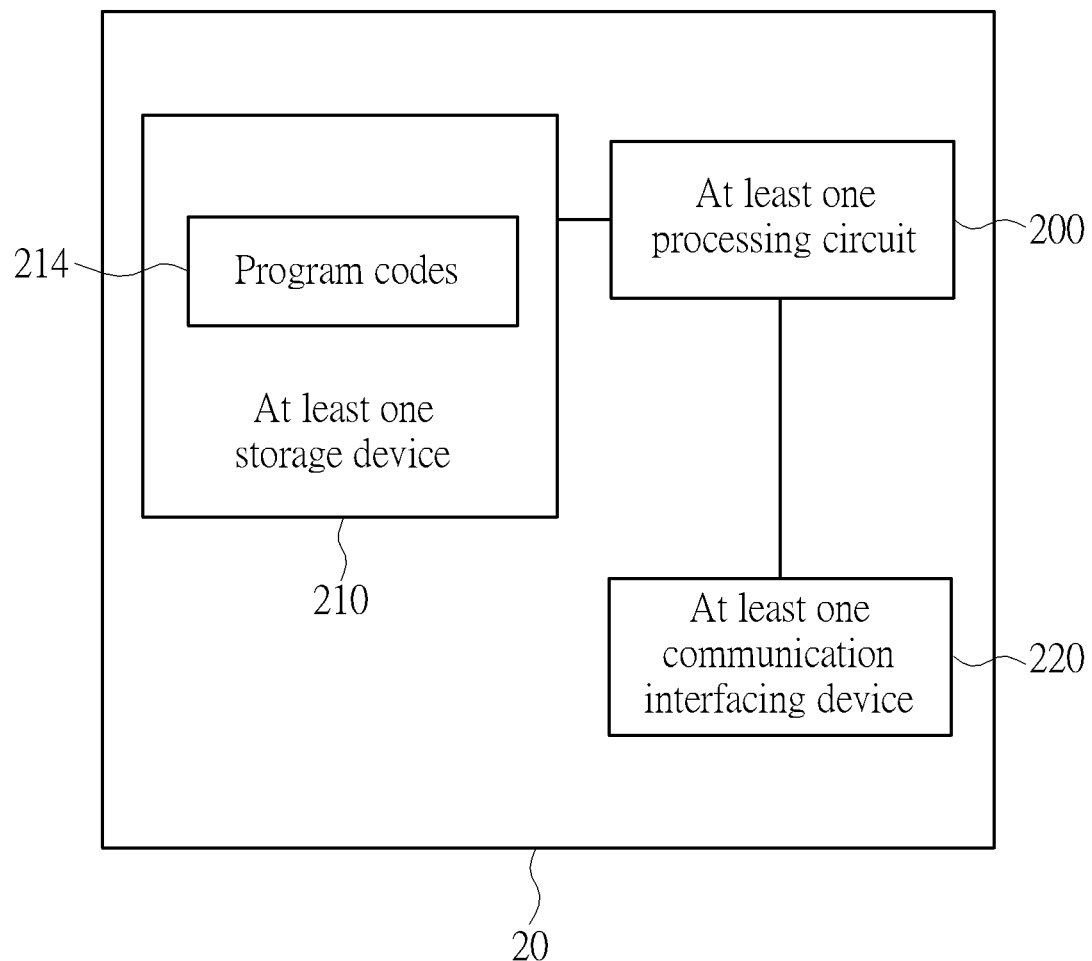
FIG. 2 is a schematic diagram of a communication device according to an example of the present invention.

In FIG. 2, the communication device 20 may be a communication device or the network shown in FIG. 1, but is not limited herein. The communication device 20 may include at least one processing circuit 200 such as a microprocessor or Application Specific Integrated Circuit (ASIC), at least one storage device 210 and at least one communication interfacing device 220. The at least one storage device 210 may be any data storage device that may store program codes 214, accessed and executed by the at least one processing circuit 200. Examples of the at least one storage device 210 include but are not limited to a subscriber identity module (SIM), read-only memory (ROM), flash memory, random-access memory (RAM), hard disk, optical data storage device, non-volatile storage device, non-transitory computer-readable medium (e.g., tangible media), etc. The at least one communication interfacing device 220 includes at least one transceiver and is used to transmit and receive signals (e.g., data, messages and/or packets) according to processing results of the at least one processing circuit 200.

In the following examples, a UE is used for representing the communication device in FIG. 1, to simplify the illustration of the embodiments.

Figure 3:
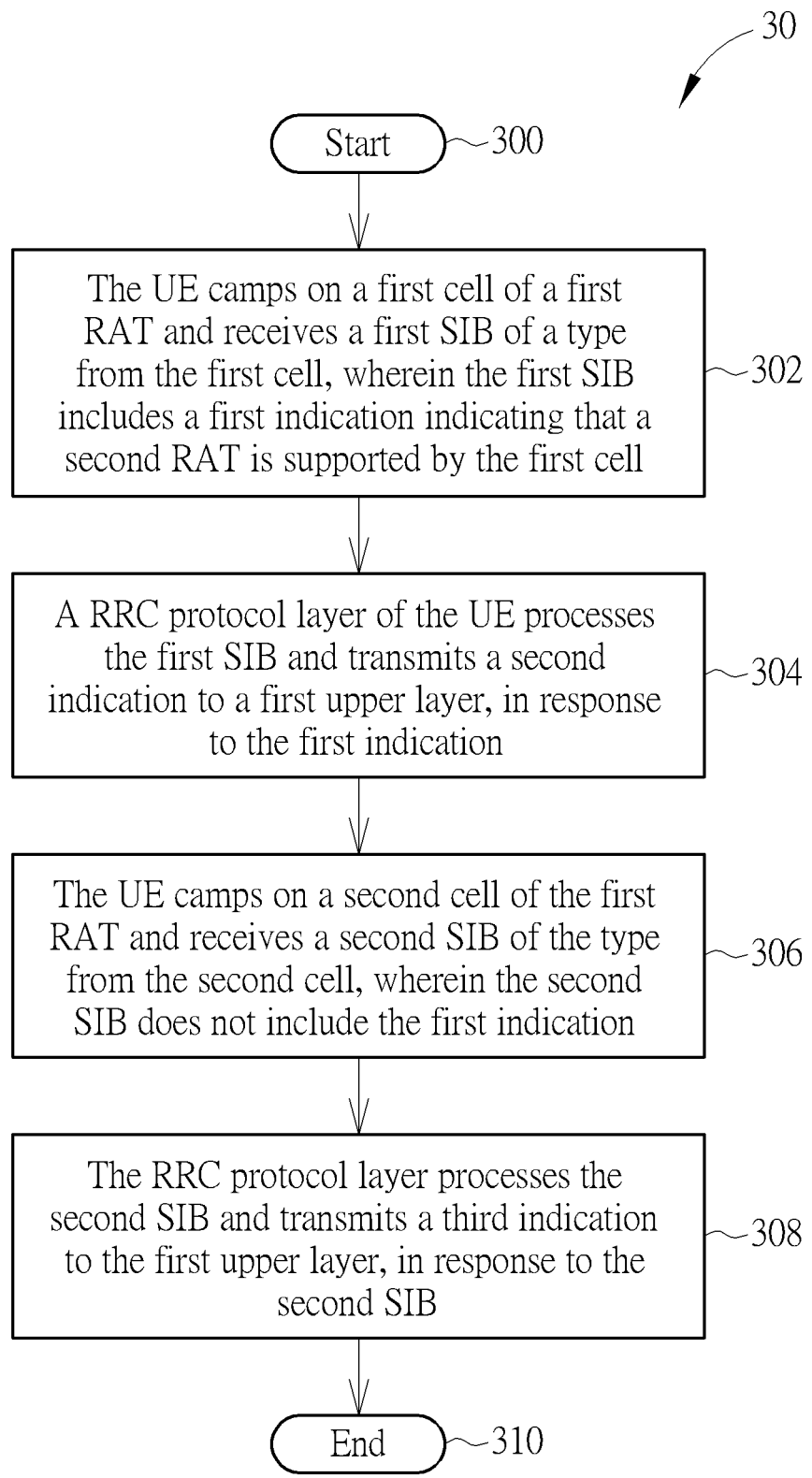
FIG. 3 is a flowchart of a process according to an example of the present invention.

A process 30 in FIG. 3 may be utilized in a UE and includes the following steps:

Step 300: Start.

Step 302: The UE camps on a first cell of a first RAT and receives a first system information block (SIB) of a type (e.g., a SIB type 2 (SIB2)) from the first cell, wherein the first SIB includes a first indication indicating that a second RAT is supported by the first cell.

Step 304: A radio resource control (RRC) protocol layer of the UE processes the first SIB and transmits a second indication to a first upper layer, in response to the first indication.

Step 306: The UE camps on a second cell of the first RAT and receives a second SIB of the type from the second cell, wherein the second SIB does not include the first indication.

Step 308: The RRC protocol layer processes the second SIB and transmits a third indication to the first upper layer, in response to the second SIB.

Step 310: End.

According to process 30, the UE transmits the third indication to the first upper layer, when the UE does not receive the first indication. Accordingly, the UE displays the icon according to the third indication, and does not display the icon according to the first indication. Thus, the problem of displaying the icon incorrectly is solved.

In one example, the first RAT includes (or is) an E-UTRA, and the second RAT includes (or is) a NR. The second RAT supported by the first cell is that a BS of the first RAT is capable of configuring the UE to connect to the second RAT via the first cell. In one example, the first indication comprises an "upperLayerIndication" field defined by a third Generation Partnership Project (3GPP) specification. In another example, the first indication indicates that a NR (or a 5G) is available or an EN-DC is available. In one example, the second indication is the same as the first indication. In one example, the second indication is generated by the RRC protocol layer according to the first indication. In another example, the third indication is generated by the RRC protocol layer in response to the second SIB.

In one example, the second indication includes a "NR" (or a "5G"), an "E-UTRA and NR" or an "EN-DC". In another example, the second indication indicates that a NR (or a 5G) is available or an EN-DC is available. In one example, the third indication includes a "long term evolution (LTE)", an "E-UTRA", a "LTE only" or an "E-UTRA only". In another example, the third indication indicates that the "upperLayerIndication" is not available, the NR (or the 5G) is not available or the EN-DC is not available.

In one example, the RRC protocol layer transmits the second indication and/or the third indication to the first upper layer, e.g., directly. That is, the first upper layer is right above the RRC protocol layer. In one example, the RRC protocol layer transmits the second indication and/or the third indication to at least one second upper layer, and the at least one second upper layer transmits the second indication and/or the third indication to the first upper layer. That is, the RRC protocol layer transmits the second indication and/or the third indication to the first upper layer via the at least one second upper layer, i.e., indirectly. The at least one second upper layer may include a mobility management (MM) layer or a connection management (CM) layer.

In one example, the UE includes a modem platform and an application platform. The modem platform may include a modem processor (e.g., Advanced RISC Machine (ARM) processor) and at least one radio frequency (RF) chip. An antenna of the UE connects to the at least one RF chip to receive signals (including the first SIB and the second SIB) from the first cell and the second cell. The 3GPP protocol stack software (including the RRC protocol layer) is executed by the modem processor. The application platform may include an application processor (e.g., ARM processor or x86 processor). An operating system (OS) (e.g., Android, iOS, Microsoft windows) is executed by the application processor. The 3GPP protocol stack software and the OS may be stored in the same storage device or different storage devices (e.g., flash memory storage device(s)) of the UE. In one example, the application platform may have at least one physical interface to connect to the modem platform. For example, the at least one physical interface includes a share memory, a universal serial bus (USB) interface, a general purpose input/output (GPIO) interface, a peripheral component interconnect (PCI) and/or an express PCI (ePCI).

In one example, the first upper layer is an interface layer implemented in the modem platform. For example, the interface layer is an attention (AT) command (i.e., Hayes command set) layer to process AT commands. The first upper layer transmits the second indication in a format of an AT command. For example, the first upper layer is an application programming interface (API) layer providing function calls to the OS.

In one example, the at least one second upper layer is implemented in the modem platform.

In some implementations, the first upper layer transmits a fourth indication to the OS, in response to the second indication. In one example, the fourth indication is the same as the second indication. In another example, the fourth indication includes (or indicates) that the second RAT is available, the first RAT and the second RAT are available, or the first RAT and the second RAT in a DC are available. For example, the fourth indication includes (or indicates) the "NR" (or the "5G"), the "SUTRA and NR", the "EN-DC", or that the NR (or the 5G) is available.

In some implementations, the first upper layer transmits a fifth indication to the OS, in response to the third indication. In one example, the fifth indication is the same as the third indication. In another example, the fifth indication includes (or indicates) that the second RAT is not available, or that the first RAT and the second RAT in the DC are not available. For example, the fifth indication includes (or indicates) the "LTE", the "E-UTRA", the "LTE only", the "E-UTRA only", that the EN-DC is not available, that the "upperLayerIndication" is not available, or that the NR (or 5G) is not available.

In one example, the first upper layer transmits the fourth indication to the OS, when the application platform is not in a power saving mode. The first upper layer does not transmit the fourth indication to the OS, when the application platform is in the power saving mode.

In one example, the first upper layer transmits the fourth indication to the OS, when detecting or knowing that the application platform leaves the power saving mode or enters a normal mode or a wake-up mode. In one example, the first upper layer transmits the fourth indication to the OS, when receiving a request from the OS. For example, the OS transmits the request by using an API or a function call of the API layer, or by using an AT command of the AT command layer. The fourth indication may be a response of the API, a response of the function call, or an AT command response responding to the AT command.

In one example, the power saving mode is called (or replaced by) a sleeping mode or a low power mode.

In one example, the first upper layer transmits the fifth indication to the OS, when the application platform is not in the power saving mode. The first upper layer does not transmit the fifth indication, when the application platform is in the power saving mode.

In one example, the first upper layer transmits the fifth indication to the OS, when detecting or knowing that the application platform leaves the power saving mode or enters the normal mode or the wake-up mode. In one example, the first upper layer transmits the fifth indication to the OS, when receiving a request from the OS. For example, the OS transmits the request by using an API or a function call of the API layer, or by using an AT command of the AT command layer. The fifth indication may be a response of the API, a response of the function call, or an AT command response responding to the AT command.

In one example, the application platform is in the power saving mode means that the application processor stays or is running in a low clock rate. The application platform is not in the power saving mode means that the application processor stays or is running in a clock rate higher than the low clock rate.

In one example, the OS receives the fourth indication from the first upper layer, and displays a first icon on a display device (e.g., screen) of the UE in response to the fourth indication. In one example, the OS receives the fifth indication from the first upper layer, and displays a second icon on the display device of the UE in response to the fifth indication. The first icon indicates (or shows) the "NR" (or the "5G"). The second icon indicates (or shows) the "LTE" (or a "fourth generation (4G)" or an "E-UTRA").

In one example, the OS displays the first icon and does not display the second icon, in response to the fourth indication. In another example, the OS still displays the second icon, when the OS displays the first icon in response to the fourth indication.

In one example, the OS displays the second icon and does not display the first icon, in response to the fifth indication.

In one example, the first upper layer transmits an incoming call indication to the OS, when the application platform is in the power saving mode and there is an incoming voice call (i.e., the modem platform receives the incoming voice call). In one example, the application platform leaves the power saving mode or enters the wake-up or normal mode, in response to the incoming call indication.

In some implementations, the RRC protocol layer transmits a sixth indication to the first upper layer, when the UE in a RRC Connected mode receives a RRC Connection Reconfiguration message configuring that the first RAT and the second RAT are in the DC (e.g., EN-DC) from the second cell. In one example, the sixth indication is the same as the second indication. The sixth indication may include the "NR" (or the "5G"), the "E-UTRA and NR", the "EN-DC", or may indicate that the EN-DC is available or configured or that the NR (or the 5G) is available or configured. In one example, the first upper layer transmits the fourth indication or a seventh indication to the OS, in response to the sixth indication. In some implementations, the seventh indication may include a "NR+" (or a "5G+"), the "NR" (or the "5G"), the "E-UTRA and NR", the "EN-DC", a "EN-DC+" or a "5G-Ultra Wide Band (5GUWB)", or may indicate that the EN-DC is available or configured or that the NR (or the 5G) is available or configured. The OS may display the first icon on the display device in response to the fourth or seventh indication, as described above.

In one example, the RRC protocol layer transmits an eighth indication to the first upper layer, when the UE leaves the RRC connected mode (e.g., due to receiving a RRC Connection Release message and camping on the second cell, a RRC Connection Reestablishment Reject, or a radio link failure). In one example, the eighth indication is the same as the third indication. The eighth indication may include the "LTE", the "E-UTRA", the "LTE only", or the "E-UTRA only", or may indicate that the "upperLayerIndication" is not available, that the EN-DC is not available or not configured, or that the NR (or the 5G) is not available or not configured.

In one example, the first upper layer transmits the fifth indication or a ninth indication to the OS, in response to the eighth indication. The ninth indication may include the "LTE", the "E-UTRA", the "LTE only", or the "E-UTRA only", or may indicate that the "upperLayerIndication" is not available, that the EN-DC is not available or not configured, or that the NR (or the 5G) is not available or not configured. The OS may display the second icon on the display device in response to the fifth indication or the ninth indication, as described above.

In one example, the eighth indication indicates that the UE leaves the RRC connected mode and enters a mode (e.g., an idle mode, an inactive mode or a light connection mode). The ninth indication may be a mode change indication indicating that the UE leaves the RRC connected mode and enters the mode. The OS displays the second icon on the display device according to the fifth indication or the ninth indication.

In one example, the fourth indication includes or does not include a first tracking area code (TAC) and/or a first cell identity of the first cell. In one example, the fifth indication includes or does not include a second TAC code and/or a second cell identity of the second cell.

Figure 4:
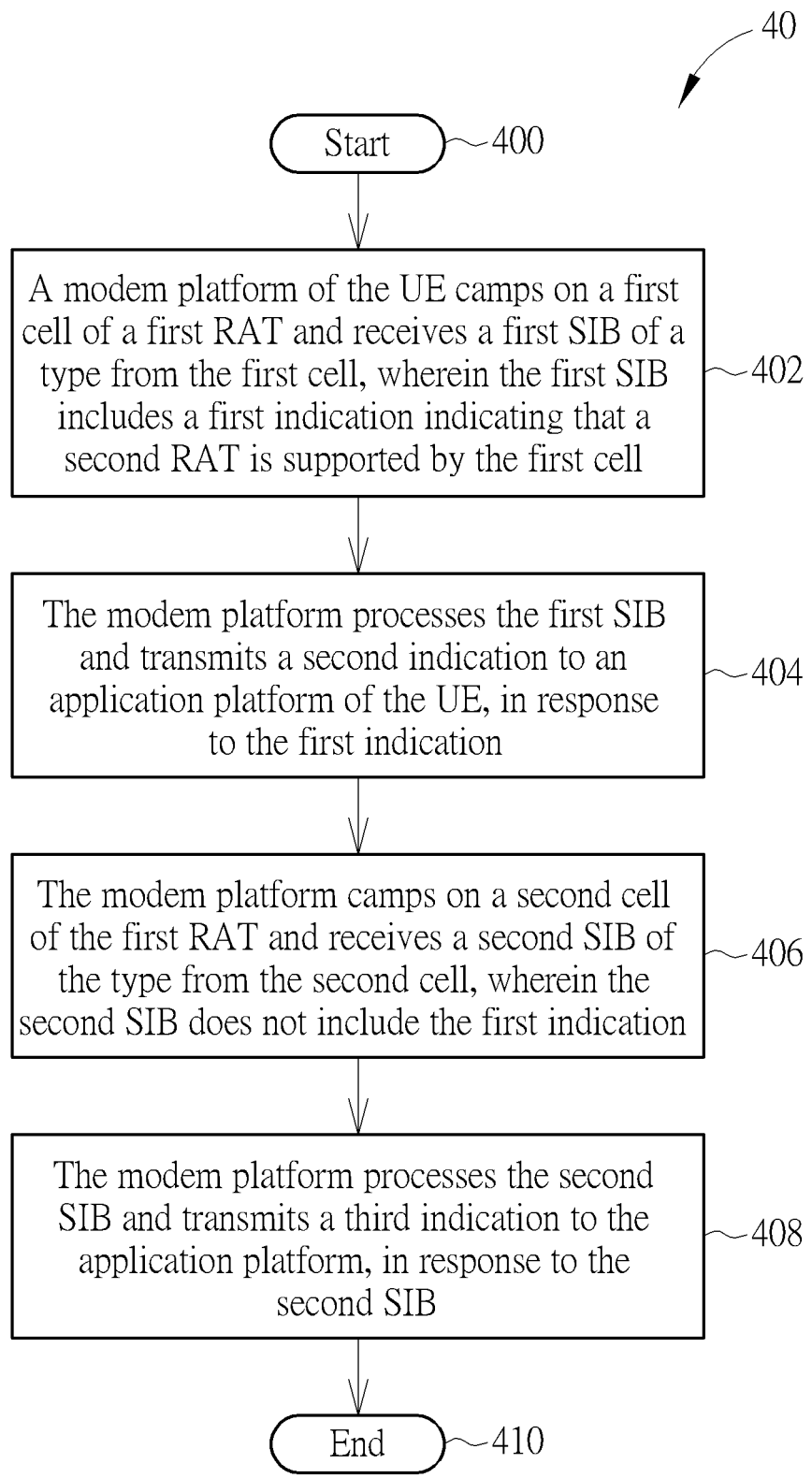
FIG. 4 is a flowchart of a process according to an example of the present invention.

It should be noted that although the above examples are illustrated to clarify the related operations of the process 30. The examples can be combined and/or modified arbitrarily according to system requirements and/or design considerations. The examples can be illustrated according to a process 40 in FIG. 4 according to an example of the present invention.

The process 40 may be utilized in a UE and includes the following steps:

Step 400: Start.

Step 402: A modem platform of the UE camps on a first cell of a first RAT and receives a first SIB of a type (e.g., a SIB2) from the first cell, wherein the first SIB includes a first indication indicating that a second RAT is supported by the first cell.

Step 404: The modem platform processes the first SIB and transmits a second indication to an application platform of the UE, in response to the first indication.

Step 406: The modem platform camps on a second cell of the first RAT and receives a second SIB of the type from the second cell, wherein the second SIB does not include the first indication.

Step 408: The modem platform processes the second SIB and transmits a third indication to the application platform, in response to the second SIB.

Step 410: End.

Examples of the process 30 may be applied to the process 40, and are not repeated herein.

Those skilled in the art should readily make combinations, modifications and/or alterations on the abovementioned steps, description and examples. Some steps described above may not be necessary for realizing the present invention. The abovementioned description, steps and/or processes including suggested steps can be realized by means that could be hardware, software, firmware (known as a combination of a hardware device and computer instructions and data that reside as read-only software on the hardware device), an electronic system, or combination thereof. An example of the means may be the communication device 20. Any of the processes above may be compiled into the program codes 214.

The abovementioned examples are described according to a perspective of the UE, and should not restrict the scope of the invention. The abovementioned examples can be easily modified to obtain examples for a BS.

To sum up, the present invention provides a method and related communication device for handling a RAT indication. The UE does not always display the icon according to the first indication. Thus, the problem that the UE does not display the icon correctly is solved.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A communication device for handling a radio access technology (RAT) indication, comprising:
   at least one storage device; and
   at least one processing circuit, coupled to the at least one storage device, wherein the at least one storage device stores instructions, and the at least one processing circuit is configured to execute the instructions of:
   the communication device camping on a first cell of a first RAT and receiving a first system information block (SIB) of a type from the first cell, wherein the first SIB comprises a first indication indicating that a second RAT is supported by the first cell;
   a radio resource control (RRC) protocol layer of the communication device processing the first SIB and transmitting a second indication to a first upper layer, in response to the first indication;
   the communication device camping on a second cell of the first RAT and receiving a second SIB of the type from the second cell, wherein the second SIB does not comprise the first indication; and
   the RRC protocol layer processing the second SIB and transmitting a third indication to the first upper layer, in response to the second SIB.

2. The communication device of claim 1, wherein the first RAT comprises an evolved universal terrestrial radio access (E-UTRA), and the second RAT comprises a new radio (NR).

3. The communication device of claim 1, wherein the first indication comprises an "upperLayerIndication" field defined by a third Generation Partnership Project (3GPP) specification.

4. The communication device of claim 1, wherein the second indication comprises a "NR", and the third indication comprises a "long term evolution (LTE)".

5. The communication device of claim 1, wherein the instruction of the RRC protocol layer transmitting the second indication to the first upper layer comprises:
   the RRC protocol layer transmitting the second indication to at least one second upper layer, and the at least one second upper layer transmitting the second indication to the first upper layer.

6. The communication device of claim 1, wherein the communication device comprises an application platform, wherein the application platform comprises an application processor executing an operating system (OS) of the communication device.

7. The communication device of claim 6, wherein the instructions further comprise:
   the first upper layer transmitting a fourth indication to the OS, in response to the second indication, wherein the fourth indication indicates that the second RAT is available, the first RAT and the second RAT are available, or the first RAT and the second RAT in a dual connectivity (DC) are available; and
   the first upper layer transmitting a fifth indication to the OS, in response to the third indication, wherein the fifth indication indicates that the second RAT is not available, or that the first RAT and the second RAT in the DC are not available.

8. The communication device of claim 7, wherein the instructions further comprise:
   the OS receiving the fourth indication from the first upper layer, and displaying a first icon on a display device of the communication device in response to the fourth indication, wherein the first icon indicates a "NR"; and
   the OS receiving the fifth indication from the first upper layer, and displaying a second icon on the display device of the communication device in response to the fifth indication, wherein the second icon indicates a "LTE".

9. A communication device for handling a radio access technology (RAT) indication, comprising:
   at least one storage device; and
   at least one processing circuit, coupled to the at least one storage device, wherein the at least one storage device stores instructions, and the at least one processing circuit is configured to execute the instructions of:
   a modem platform of the communication device camping on a first cell of a first RAT and receiving a first system information block (SIB) of a type from the first cell, wherein the first SIB comprises a first indication indicating that a second RAT is supported by the first cell;
   the modem platform processing the first SIB and transmitting a second indication to an application platform of the communication device, in response to the first indication;
   the modem platform camping on a second cell of the first RAT and receiving a second SIB of the type from the second cell, wherein the second SIB does not comprise the first indication; and
   the modem platform processing the second SIB and transmitting a third indication to the application platform, in response to the second SIB.

* * * * *